(12) United States Patent
Venkat et al.

(10) Patent No.: US 11,733,981 B2
(45) Date of Patent: Aug. 22, 2023

(54) METHODS, SYSTEMS, ARTICLES OF MANUFACTURE AND APPARATUS TO AUTOMATICALLY OPTIMIZE SOFTWARE PROGRAMS

(71) Applicant: Intel Corporation, Santa Clara, CA (US)

(72) Inventors: Anand Venkat, San Jose, CA (US); Justin Gottschlich, Santa Clara, CA (US); Shengtian Zhou, Palo Alto, CA (US); Vasileios Porpodas, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 17/103,477

(22) Filed: Nov. 24, 2020

(65) Prior Publication Data
US 2021/0103434 A1 Apr. 8, 2021

Related U.S. Application Data

(60) Provisional application No. 62/940,073, filed on Nov. 25, 2019.

(51) Int. Cl.
*G06F 9/44* (2018.01)
*G06F 8/41* (2018.01)
*G06F 16/22* (2019.01)
*G06F 8/75* (2018.01)
*G06F 8/77* (2018.01)

(52) U.S. Cl.
CPC .............. *G06F 8/443* (2013.01); *G06F 8/75* (2013.01); *G06F 8/77* (2013.01); *G06F 16/2255* (2019.01)

(58) Field of Classification Search
None
See application file for complete search history.

(56) References Cited

U.S. PATENT DOCUMENTS

| | | | |
|---|---|---|---|
| 9,823,911 B2 * | 11/2017 | Chiba | .................. G06F 8/40 |
| 10,853,043 B2 * | 12/2020 | Caballero de Gea | ... G06F 8/447 |
| 2014/0282444 A1 * | 9/2014 | Araya | ....................... G06F 8/42 717/143 |

(Continued)

OTHER PUBLICATIONS

Gottschlich et al., "The Three Pillars of Machine Programming," May 8, 2018, 11 pages.

(Continued)

*Primary Examiner* — Qamrun Nahar
(74) *Attorney, Agent, or Firm* — Hanley, Flight & Zimmerman, LLC

(57) ABSTRACT

An example apparatus comprises a transformation generator to generate a population of code variants corresponding to an input code, the population of code variants to include transformation sequences of the input code, a dependence analyzer to analyze the population of code variants for dependence vectors, a profile controller to profile the population of code variants to determine performance metrics of hardware during an execution of respective ones of the transformation sequences, and a hash code generator to generate hash codes for storing in a database, the hash codes (a) corresponding to a combination of the dependence vectors and respective performance metrics and (b) mapped to respective transformation sequences.

25 Claims, 8 Drawing Sheets

(56) References Cited

U.S. PATENT DOCUMENTS

2019/0317880 A1* 10/2019 Herr .................... G06F 11/3447
2021/0089435 A1* 3/2021 Bhandarkar ........ G06F 11/3604

OTHER PUBLICATIONS

Adams et al., "Learning to Optimize Halide with Tree Search and Random Programs," ACM Transactions on Graphics, 38(4), Article No. 121, Jul. 2019, 12 pages.
Chen et al., "Learning to Optimize Tensor Programs," 32nd Conference on Neural Processing Systems, Jan. 8, 2019, 16 pages.
Ragan-Kelly et al., "Halide: A language and Compiler for Optimizing Parallelism, Locality, and Recomputation in Image Processing Pipelines," ACM SIGPLAN Notices, 48(6), Jun. 23, 2013, 13 pages.
Ansel et al., "OpenTuner: An Extensible Framework for Program Autotuning," Proceedings of the 23rd International Conference on Parallel Architectures and Compilation, Aug. 2014, pp. 303-315 (13 pages).
Mullapudi et al., "Automatically Scheduling Halide Image Processing Pipelines. ACM Trans," ACM Transactions on Graphics, 35(4), Article No. 83, Jul. 2016, 11 pages.
Bondhugula., "A Practical Automatic Polyhedral Parallelizer and Locality Optimizer," Proceedings of the 29th ACM SIGPLAN Conference on Programming Language Design and Implementation (PLDI '08), 43(6), 13 pages.
Pouchet et al., "Iterative Optimization in the Polyhedral Model: Part I, One-Dimensional Time," Proceedings of the International Symposium on Code Generation and Optimization, Mar. 2007, 13 pages.
Pouchet et al., "Iterative Optimization in the Polyhedral Model: Part II, Multidimensional Time," Proceedings of the 29th ACM SIGPLAN Conference on Programming Language Design and Implementation, Jun. 2008, 11 pages.
Ashouri et al., "A Survey on Compiler Autotuning using Machine Learning," ACM Computing Surveys, 51(5), Sep. 3, 2018, 42 pages.
Wolf et al., "A Data Locality Optimizing Algorithm," Proceedings of the SIGPLAN '91 Conference on Programming Language Design and Implementation, 39(4), Apr. 2004, pp. 30-44, 15 pages.
D. Raj Reddy, "Speech Understanding Systems: A Summary of Results of the Five-Year Research Effort at Carnegie-Mellon University," Department of Computer Science Technical Report. Carnegie Mellon University, Aug. 1977, 180 pages.
Jangda et al., "An Effective Fusion and Tile Size Model for Polymage", ACM Transactions on Programming Languages and Systems vol. 42, No. 3, Article 12, Nov. 2020, 27 pages.

* cited by examiner

METHODS, SYSTEMS, ARTICLES OF MANUFACTURE AND APPARATUS TO AUTOMATICALLY OPTIMIZE SOFTWARE PROGRAMS

RELATED APPLICATION

This patent arises from a continuation of U.S. Provisional Patent Application Ser. No. 62/940,073, which was filed on Nov. 25, 2019. U.S. Provisional Patent Application Ser. No. 62/940,073 is hereby incorporated herein by reference in its entirety. Priority to U.S. Provisional Patent Application Ser. No. 62/940,073 is hereby claimed.

FIELD OF THE DISCLOSURE

This disclosure relates generally to software programs, and, more particularly, methods, systems, articles of manufacture and apparatus to automatically optimize software programs.

BACKGROUND

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

BRIEF DESCRIPTION OF THE DRAWINGS

FIG. 5, are flowcharts representative of example machine readable instructions which may be executed to implement the example compiler training system of FIG. 1 to update a transformation database with optimal transformations of input code.

Figure 1:
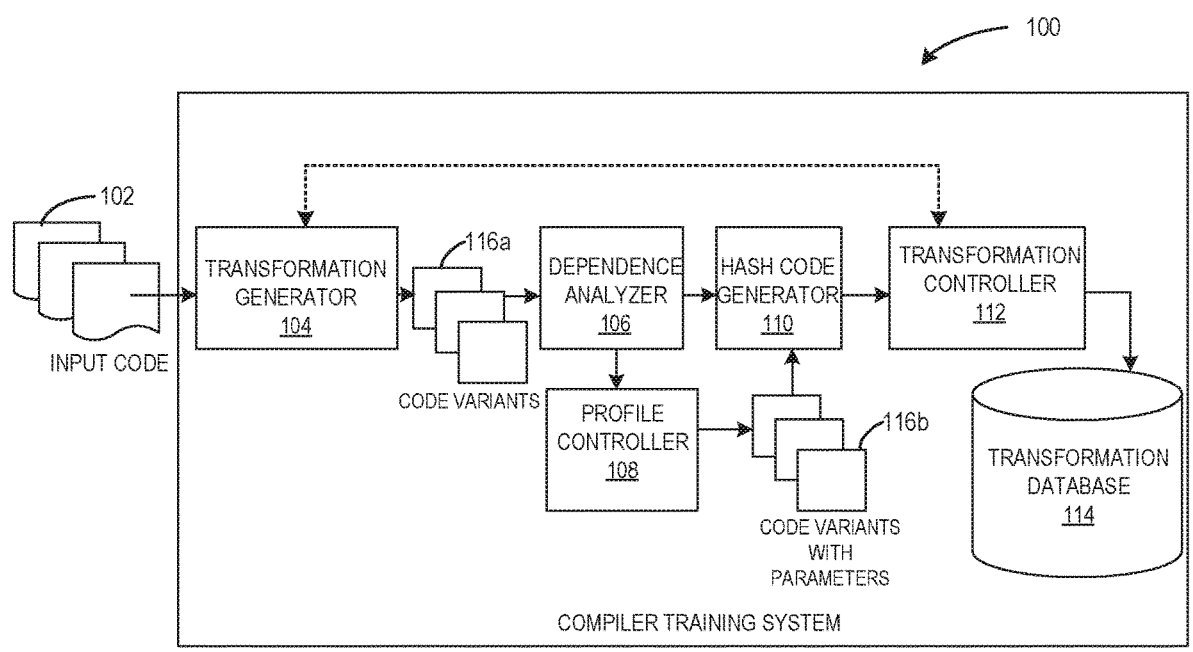
FIG. 1 is a block diagram of an example compiler training system to update a transformation database with optimal code transformations.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Maintaining performance portability across a range of software programs and generations of hardware has historically been a challenging problem. However, machine learning (ML) provides an opportunity to address the challenge of maintaining (e.g., tuning) performance portability in software programs by utilizing techniques that learn to optimize software programs. Performance portability is the ability of a software program (e.g., an application, an algorithm, etc.) to achieve high performance across a variety of target systems (e.g., laptops, mobile phones, tablets, etc.), where high performance is relative to the type of target system. In some examples, performance portability becomes unreachable when compilers do not transform a software program in a manner that enables the software program to perform efficiently on the target hardware (e.g., the hardware implementing the compiler).

In conventional methods, a compiler is utilized for determining transformations of high performance computing software programs (e.g., applications). The compiler may perform analysis of a software program to determine potential transformations of the software programs. For example, dependence analysis is a compiler analysis technique that guides transformations of software programs for identifying dependences in the software program (e.g., statement B in the program depends on statement A in the program and, thus, statement A must be executed before statement B can be executed) to reorder or parallelize the statements in the software program. Such parallelization assists in optimizing memory accesses during execution of the software program. However, the conventional methods limit the type of transformations applied due to incomplete knowledge or insufficient analysis of the hardware of the target systems for each of the transformations.

Examples disclosed herein may be used to automatically tune the performance of software programs by utilizing a combination of compiler optimizations, ML techniques, analytical cost models, and profiled hardware performance data. Examples disclosed herein improve software program efficiency and programmer, developer, and/or user productivity as the examples disclosed herein learn to optimize software programs from a database of transformations and specific use cases.

Examples disclosed herein augment compiler transformation analysis (e.g., dependence analysis on compiler transformations) with profiled data analysis (e.g., analysis of hardware performance data) to improve efficiency of software programs and optimization of corresponding transformations.

In examples disclosed herein, the compiler utilizes ML (e.g., feedback guided optimization) to learn the optimal values of transformation parameters, where the optimal values of transformation parameters are utilized to optimize the hardware with corresponding transformations of software programs.

Examples disclosed herein include at least one database to store optimized transformations applied to software programs with different dependence patterns and profiled data characteristics. The example database enables the compiler to execute a self-tuning system (e.g., automatically tune the performance of software programs, self-tune in response to receiving new and/or unknown programs, etc.) by allowing the self-tuning system to train based on the stored transformations and to infer optimizations for new software programs. Examples disclosed herein propose that the self-tuning system automatically optimize program efficiency by taking into account a compiler dependence graph (e.g., a graph indicative of the dependence analysis results) and runtime profile data.

FIG. 1 is a block diagram of an example compiler training system 100 to update a transformation database with optimal code transformations. The compiler training system 100 includes an example transformation generator 104, an example dependence analyzer 106, an example profile controller 108, an example hash code generator 110, an example transformation controller 112, and an example transformation database 114.

In FIG. 1, the compiler training system 100 is a compiler in a training mode. For example, the compiler training system 100 may be a compiler implemented for a system (e.g., a device) that is initiated to populate the transformation database 114 with trained input code transformations. In some examples, the compiler training system 100 trains compiler features, such as features from profile analysis and transformation analysis, to learn ways to optimize a program (e.g., input code 102) for the hardware implementing the compiler training system 100. In this manner, systems having different hardware architecture may require a different training system to learn how to optimize a program.

In FIG. 1, the example compiler training system 100 obtains example input code 102. The example input code 102 may include, but is not limited to, a software program, training data, input data, software, a sequence of information, or any other type of input data that is to perform a service. In the illustrated example of FIG. 1, the input code 102 may be training data utilized for training purposes. In some examples, the input code 102 is loop-based code. Loop-based code is a code structure that repeats a sequence of instructions until a specific condition is met. In some examples, loop-based code is used to cycle through values, add sums of numbers, repeat functions, etc.

In FIG. 1, the transformation generator 104 obtains input code 102 and extracts a polyhedral representation of the input code 102. In examples disclosed herein, a polyhedral representation of input code (e.g., input code 102) is a representation of both sequential and parallel parts of the code. Sequential parts of input code (e.g., input code 102) are the lines in the code that are executed in a specific order. In some examples, the sequential parts of input code (e.g., input code 102) have dependencies, thus causing them to be executed in a specific order. Parallel parts of the code (e.g., input code 102) are lines in the code that can be executed at the same time as one another. For example, the parallel parts of the input code 102 can be executed by a processor in parallel, enabling a faster execution of the input code. In some examples, the transformation generator 104 generates the polyhedral representation (e.g., a polyhedral cost model) of the input code 102 when the input code 102 is new to the transformation generator 104. For example, when the transformation generator 104 does not have a previously generated polyhedral cost model corresponding to the input code 102, the transformation generator 104 generates the polyhedral cost model. In examples disclosed herein, a polyhedral cost model is a model of compositions of complex transformations.

The transformation generator 104 generates the polyhedral cost model to derive an initial set of profitable (e.g., optimal, appropriate, etc.) code transformations. For example, the transformation generator 104 utilizes the polyhedral cost model to analyze the input code 102 to determine a variation of code transformations. In some examples, the code transformations are a suite of classical loop transformations including loop tiling, unrolling, fusion, interchange etc., that can be applied to the different levels of loops and statements in the input code 102. In some examples, the transformation generator 104 utilizes the polyhedral cost model to generate a transformation recipe (e.g., code variants 116a) for the input code 102 that the polyhedral cost model quantifies as optimal relative to its analysis. For example, the polyhedral cost model generates code variants 116a based on analysis of the input code 102, the analysis to analyze the input code 102 for the most optimal combination of transformations.

The example transformation generator 104 populates code variants 116a of the input code 102 based on the transformations identified in the polyhedral cost model. Code variants represent alternative implementations of input code (e.g., input code 102), and each code variant corresponds to a state in a tree (e.g., an abstract syntax tree, node graph, etc.) of all possible program states. Code variants are used to facilitate selecting the most appropriate (e.g., optimal) implementation of the input code 102 for a specific execution context (e.g., target architecture and input dataset). In some examples, code variants (e.g., code variants 116a) incorporate different sets of transformations in different orders (e.g., different transformation sequences). For example, the transformation generator 104 groups together transformations in a first order to generate a first code variant, in a second order to generate a second code variant, etc. In some examples, the transformation generator 104 populates the initial set of code variants 116a based on the query of the polyhedral cost model. For example, the polyhedral cost model includes the optimal combination of transformations for the input code 102 relative to the analysis. In other examples, the transformation generator 104 randomly selects orders of transformations utilizing a random number generator and/or any random selection technique.

In some examples, the transformation generator 104 recognizes the input code 102 and determines that a population of code variants has previously been generated. In some examples, the transformation generator 104 recognizes the input code 102 based on a query (e.g., a search, scan, etc.) of memory for identical code, identical metadata, a corresponding cost model, etc. In such an example, the transformation generator 104 obtains and/or retrieves the code variants from memory (e.g., local memory, extended memory, etc.).

The example transformation generator 104 generates successor transformations and transformation sequences based on invoking a genetic search based algorithm on the transformations in the code variants 116a. The genetic search based algorithm is an optimization technique that iteratively mutates (e.g., changes) transformations into successor transformations that represent an optimal solution for the target architecture and input code 102. For example, the transformation generator 104 applies the genetic search based algorithm to the transformations that make up the code variants 116a to mutate the transformations in order to explore a sufficiently diverse set of code variants. In some examples, the transformation generator 104 invokes the genetic search based algorithm on code variants 116a that were previously generated and stored in memory. For example, if input code 102 is not new (e.g., if the transformation generator 104 recognizes the input code 102), the transformation generator 104 generates the successor transformations based on the genetic search based algorithm. In some examples, the transformation generator 104 continues to mutate transformations and transformation sequences until convergence is reached. For example, during training, the transformation generator 104 and/or the transformation controller 112 identifies when a transformed input code 102 is convergent based on a pre-defined threshold that indicates a satisfiable performance (e.g., execution time) of the hardware (e.g., the target hardware) during execution of the input code 102. In some examples, the transformation generator 104 notifies the transformation controller 112 that additional mutations of the transformations and transformation sequences can be determined. In other examples, the transformation generator 104 obtains information and/or notifications from the transformation controller 112 to determine new mutations for the code variants 116a when the profile controller 108 outputs profile results less than the pre-defined threshold indicative of a satisfiable performance of the hardware (discussed in further detail below).

In some examples, the example transformation generator 104 implements example means for transforming code. The means for transforming code is implemented by executable instructions such as that implemented by at least blocks 502, 504, 506, 508, 510, 512, 514, and 516 of FIG. 5, as described in further detail below. The executable instructions of blocks 502, 504, 506, 508, 510, 512, 514, and 516 of FIG. 5 may be executed on at least one processor such as the example processor 712 of FIG. 7. In other examples, the means for transforming code is implemented by hardware logic, hardware implemented state machines, logic circuitry, and/or any other combination of hardware, software, and/or firmware.

In FIG. 1, the example compiler training system 100 includes the dependence analyzer 106 to perform a dependence analysis on the code variants 116a. In examples disclosed herein, the dependence analysis analyzes the transformed loops in the code variants 116a to determine iterations in the levels of loops that have dependences. In some examples, the dependences identify scheduling constraints (e.g., required orders of execution) in the input code 102. The example dependence analyzer 106 may iteratively perform dependence analysis on the transformations in the code variants 116a. For example, the dependence analyzer 106 selects a first code variant in the population of code variants and iteratively performs a search for dependences in the loop iterations, starting from the outermost loop and working inward to the innermost loop (e.g., if the code variant includes nested loops). A dependence analysis of a loop program and/or loop transformation reveals which loop levels in the input code 102 and/or the code variants carry dependences and which loops are parallelizable.

In some examples, the dependence analyzer 106 generates and/or extracts dependence vectors from the analysis for each code variant. A dependence vector is a numerical value and/or code indicative of a distance in terms of loop iteration count. For example, in a nested loop, the outer and inner loops may read/write (e.g., access) data to the same memory location, and the number of iterations of loops required to execute before an inner loop executes that access is the distance (dependence vector) of that inner loop from the memory access. In some examples, the dependence analyzer 106 annotates the code variants 116a with the dependence vectors. For example, the dependence analyzer may concatenate and/or append the dependence vectors in their respective code variant 116a.

In some examples, the dependence analyzer 106 performs the dependence analysis to determine which code variants 116a are illegal, do not preserve the semantics of the original input code 102, and/or do not have high profit (e.g., a profit metric that satisfies one or more thresholds). The dependence analysis enables the dependence analyzer 106 to eliminate (e.g., invalidate, remove, prune, etc.) illegal transformations to constrain the search space of possible transformations for subsequent processing. The dependence analyzer 106 prunes the transformations, transformation sequences, and/or code variants that include negative dependence vectors. A negative dependence vector indicates that a combination of transformations, generated by the transformation generator 104, does not work (e.g., does not preserve the semantics of the input code 102). For example, a dependence vector is positive when a statement A is a write and a statement B is a read and occurs after statement A (e.g., statement B reads from a memory location that statement A wrote to). A dependence vector is negative when a statement A is a read operation and a statement B is a write operation (e.g., statement A is attempting to read from a memory location before the correct value was written to it). Such example statements may be iterations in the loop levels of a code variant 116a. The dependence analyzer 106 may remove a first code variant of the population of code variants 116a when the combination of transformations (e.g., a combination of first, second, third, fourth, etc., transformations identified in the polyhedral cost model) include one or more negative dependence vectors.

In some examples, the example dependence analyzer 106 implements example means for analyzing dependences and identifying dependence vectors. The means for analyzing dependences and identifying dependence vectors is implemented by executable instructions such as that implemented by at least blocks 518, 520, and 522 of FIG. 5. The executable instructions of blocks 518, 520, and 522 of FIG. 5 may be executed on at least one processor such as the example processor 712 of FIG. 7. In other examples, the means for analyzing dependences and identifying dependence vectors is implemented by hardware logic, hardware implemented state machines, logic circuitry, and/or any other combination of hardware, software, and/or firmware.

In FIG. 1, the example compiler training system 100 includes the example profile controller 108 to profile hardware of the target architecture with the population of remaining code variants 116a. To profile hardware is to execute the transformed code and generate a file of information corresponding to how the hardware performed with the transformed code, what paths were traversed most often in the transformed code, etc. In some examples, the profile controller 108 extracts the information and/or, otherwise referred to herein out, performance metrics from hardware performance counters. The hardware performance counters are implemented by registers, such as special purpose registers, to store counts of hardware-related activities within the target architecture. In some examples, the hardware performance counters measure the number of cache misses, the number of instructions issued by the transformed input code 102, the number of floating point instructions executed, etc. In some examples, the profile controller 108 maps the performance metrics collected from the hardware performance counters to specific transformed code in the code variants in order to determine the problematic code variants and the efficient/optimal code variants.

In some examples, the profile controller 108 obtains the code variants 116a with unspecified parameters. For example, the code variants 116a include transformations in their relative order but the code variants 116a do not yet include transformations instantiated with specified parameters. For example, tiling and unrolling (examples of transformation types) require explicit integer parameters for execution. In such an example, the profile controller 108 must instantiate initial parameters for the code variants 116a. In some examples, the profile controller 108 selects initial parameters randomly utilizing a random number generator and/or any other type of random selection technique. When the profile controller 108 instantiates the parameters for the code variants 116a, the profiling is performed. In some examples, the profile controller 108 profiles the code variants 116a separately. For example, the profile controller 108 executes a first code variant of the code variants 116a, determines profile metrics, sends the annotated code variant to the hash code generator 110, then profiles a second code variant of the code variants 116a that has not yet been profiled. This process repeats until all of the code variants 116a have been annotated with performance metrics.

In some examples, the profile controller 108 utilizes feedback directed optimization to incrementally update or search for optimal parameters for each transformation, until no further improvement is obtained as indicated by the hardware performance counters. For example, after profiling, the profile controller 108 determines if the performance metrics were indicative of an improvement in hardware performance. In some examples, the profile controller 108 observes metrics across different code variants to determine general trends of the performance metrics. For example, the profile controller 108 may observe cache misses across all of the code variants 116a and determine an average number of cache misses based on the observation. In this manner, the example profile controller 108 determines optimal parameter values by comparing performance metrics, generated from code variants instantiated 116a with the parameter values, to one or more general trends, averages, etc. In some examples, performance metrics with high values corresponding to a count and/or metric that exceeds at least one threshold count and/or metric, are optimal. In other examples, performance metrics with low values corresponding to a count and/or metric that is less than at least one threshold count and/or metric, are optimal. Either way, the example profile controller 108 determines that the initial parameters were optimal, sufficient, or inefficient and further updates the parameters based on the corresponding performance metrics. In some examples, the feedback directed optimization includes feeding back the performance metrics to the beginning steps of parameter selection so that the profile controller 108 can analyze the metrics and update the parameters as needed. In some examples, after multiple iterations of feedback, the profile controller 108 determines that the code variants can no longer be improved with different parameters for hardware performance. For example, when the minimum execution time across the code variants 116a no longer decreases with new parameter values, the profile controller 108 determines the parameter values can no longer be improved. In such an example, the profile controller 108 instantiates the code variants 116a with the most recently updated (e.g., last used) parameters. In some examples, the profile controller 108 records a success rate of the branches traversed (e.g., the edges of an abstract syntax tree, a parse tree, etc., that connect ones of code variants 116a). For example, during profiling, the hardware performance counters can identify what order of code variants were most efficient based on their respective function (e.g., counting cache misses, counting time taken to execute code variants 116a in one order versus a different order, etc.). The example profile controller 108 outputs annotated code variants 116b with parameters and success rates of branches traversed. The annotated code variants 116b are described in further detail below in connection with FIG. 2

In some examples, the profile controller 108 implements example means for profiling. The means for profiling is implemented by executable instructions such as that implemented by at least blocks 524, 526, 528, 530, 532, and 534 of FIG. 5. The executable instructions of blocks 524, 526, 528, 530, 532, and 534 of FIG. 5 may be executed on at least one processor such as the example processor 712 of FIG. 7. In other examples, the means for profiling is implemented by hardware logic, hardware implemented state machines, logic circuitry, and/or any other combination of hardware, software, and/or firmware.

Figure 2:
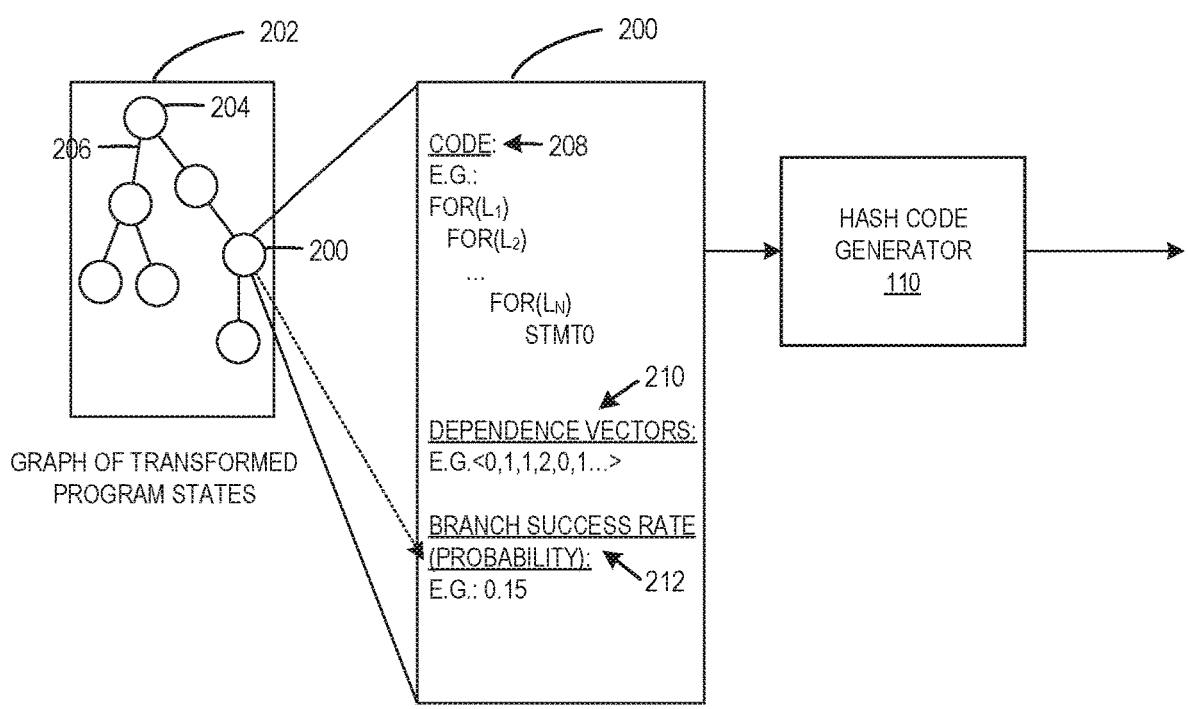
FIG. 2 illustrates an example annotated code variant.

Turning to FIG. 2, an example annotated code variant 200 is illustrated. In FIG. 2, the example annotated code variant 200 is a zoomed in version of a node in a graph of transformed program states 202 and is provided to the example hash code generator 110.

In FIG. 2, the example graph of transformed program states 202 is a transformed abstraction of the input code 102. The example graph of transformed program states 202 includes example nodes 204 and example edges 206. The example nodes 204 are code variants of program states in the original input code 102. A program state represents contents of a memory location at any given point in the program's (e.g., the input code 102) execution. The contents of the memory location are data, stored in example variables by the program (e.g., the input code 102). For example, the input code 102 stores data in variables and the variables represent storage locations in the memory of the target architecture. The example edges 206 are representative of relationships between the nodes 204 (e.g., the program states). For example, the edges 206 determine assignments of integers to variables, assignments of mathematical expressions to integers and variables, which variables are in loops, etc. In some examples, the transformation generator 104 of FIG. 1 transforms the nodes 204 and edges 206 by rearranging the edges 206 and rewriting the nodes 204 in a manner that reduces the number of nodes 204 but maintains the same semantics of the input code 102.

In FIG. 2, the annotated code variant 200 is a program state (e.g., a node 204) that has been annotated (e.g., updated, marked up, etc.) by the example profile controller 108 of FIG. 1. The example annotated code variant 200 includes example code 208, example dependence vectors 210, and an example branch success rate 212.

The example code 208 includes a nested loop that has been transformed by the example transformation generator 104 of FIG. 1. The example code 208 includes N levels of loops. For example, the first level (L1) is an outer "for" loop that executes before the second level (L2) inner "for" loop.

The example dependence vectors 210 are values corresponding to the dependencies of the different N levels of loops in the example code 208. For example, the first dependence vector "0" corresponds to the first level (L1) "for" loop, the second dependence vector "1" corresponds to the second level (L2) "for" loop, etc. The first dependence vector is "0" because the first "for" loop (L1) does not depend on a different loop to access a memory location. The second dependence vector is "1" because the second "for" loop (L2) depends on one loop iteration (e.g., the first "for" loop L1) to execute before accessing the memory location.

The example branch success rate 212 illustrates a probability (e.g., 0.15) that the branch taken led to a better performance (e.g., faster, no illegal dependences, etc.) relative to the original branch of the input code 102. In examples disclosed herein, the branch is the transformed edge and node in the graph of transformed program states 202. In some examples, if the program state (e.g., a state of the input code 102) transformed from a parent node to a specific child node (e.g., code variant), the branch success rate 212 illustrates the probability that the transformed child node (e.g., the code variant) led to a better performance than the parent node. In some examples, the profile controller 108 of FIG. 1 determines that probability based on the hardware performance counters of the target architecture.

In FIG. 2, the annotated code variant 200 is provided to the example hash code generator 110. Returning to FIG. 1, the example compiler training system 100 includes the example hash code generator 110 to generate a hash of the annotated code variants (e.g., 116b and/or 200). In some examples, the hash code generator 110 generates a hash table including a summary of the entries (e.g., the hashes) representing the instantiated transformed program states, their respective dependences (e.g., the dependence vectors), and their respective performance probabilities. The example hash code generator 110 may implement any hashing function to generate hashes of the example code variants 116b.

In some examples, the hash code generator 110 implements example means for generating hash codes. The means for generating hash codes is implemented by executable instructions such as that implemented by at least blocks 536 and 538 FIG. 5. The executable instructions of blocks 536 and 538 FIG. 5 may be executed on at least one processor such as the example processor 712 of FIG. 7. In other examples, the means for generating hash codes is implemented by hardware logic, hardware implemented state machines, logic circuitry, and/or any other combination of hardware, software, and/or firmware.

In FIG. 1, the example compiler training system 100 includes the example transformation controller 112 to determine if a target performance (e.g., a threshold value) was reached during profiling using the transformations applied by the example transformation generator 104. The example transformation controller 112 may check for peak performance of the hardware of the target architecture. In some examples, the peak performance may be user defined in the input code 102 (e.g., optimize for latency, optimize for throughput, etc.). In other examples, the hardware architecture has a system peak in terms of floating point operations. In this manner, the example transformation controller 112 can compare the peak performance with the performance metrics (e.g., performance probability of the code variants to determine if target performance was reached). In some examples, the transformation controller 112 controls a regeneration of transformations. For example, the transformation controller 112 triggers the transformation generator 104 to generate successor transformations of previously generated transformations for the input code 102 when the target performance was not reached. In other examples, the transformation controller 112 stores the transformations and their respective hash codes in the example transformation database 114 when the target performance was reached.

In some examples, the dependence analyzer 106 implements example means for controlling transformation regeneration. The means for controlling transformation regeneration is implemented by executable instructions such as that implemented by at least block 540 of FIG. 5. The executable instructions of blocks 540 of FIG. 5 may be executed on at least one processor such as the example processor 712 of FIG. 7. In other examples, the means for controlling transformation regeneration is implemented by hardware logic, hardware implemented state machines, logic circuitry, and/or any other combination of hardware, software, and/or firmware.

In FIG. 1, the example compiler training system 100 includes the example transformation database 114 to store optimized transformations and their respective hash codes for input code (e.g., input code 102). In some examples, the transformation database 114 is accessed by compilers implemented on similar architecture as the architecture on which the example compiler training system 100 is implemented. For example, the compiler training system 100 may be implemented on a specific type of hardware. The hardware is indicative of the target architecture in which the compiler training system 100 is learning how to optimize code for. In this manner, the example transformation database 114 can provide optimal code transformations to any compiler system implemented on similar architecture.

While an example manner of implementing the compiler training system 100 of FIG. 1 is illustrated in FIG. 1, one or more of the elements, processes and/or devices illustrated in FIG. 1 may be combined, divided, re-arranged, omitted, eliminated and/or implemented in any other way. Further, the example transformation generator 104, the dependence analyzer 106, the example profile controller 108, the example hash code generator 110, the example transformation controller 112, and/or, more generally, the example compiler training system 100 of FIG. 1 may be implemented by hardware, software, firmware and/or any combination of hardware, software and/or firmware. Thus, for example, any of the example transformation generator 104, the dependence analyzer 106, the example profile controller 108, the example hash code generator 110, the example transformation controller 112, and/or, more generally, the example compiler training system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transformation generator 104, the dependence analyzer 106, the example profile controller 108, the example hash code generator 110, and/or the example transformation controller 112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example compiler training system 100 of FIG. 1 may include one or more elements, processes and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
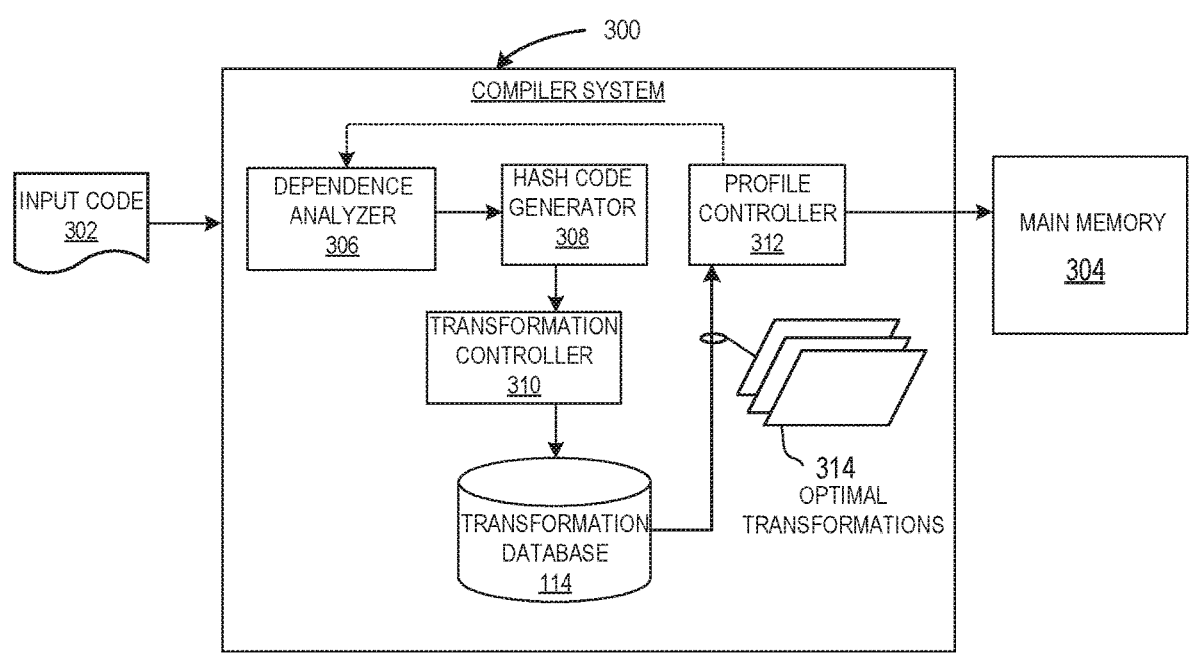
FIG. 3 is an example compiler system to implement the example transformation database of FIG. 1 to infer optimal code transformations of new input code.

FIG. 3 is a block diagram of an example compiler system 300 to implement the example transformation database 114 of FIG. 1 to infer optimal code transformations of new input code 302. The example compiler system 300 is operating in an inference mode to generate optimal code transformations of the input code 302 (e.g., in real time). The example compiler system 300 is coupled an example main memory 304. The example compiler system 300 includes an example dependence analyzer 306, an example hash code generator 308, an example transformation controller 310, the example transformation database 114, and an example profile controller 312.

In FIG. 3, the example compiler system 300 is a compiler that includes profile-guided autotuning. The example compiler system 300 is implemented by hardware, the hardware in communication with and/or included in the target architecture (e.g., a processor, multiple processors, accelerators, etc.). The example compiler system 300 is to obtain input code 302 and transform the input code 302 into a machine-readable language based on information (e.g., code variants and respective hash codes) stored in the example transformation database 114.

In FIG. 3, the input code 302 is untransformed software. In some examples, the input code 302 represents an application intended to run on a particular target architecture. In some examples, the input code 302 is a computationally intensive application (e.g., requires high bandwidth, a lot of processing time and power, etc.) designed for a specific architecture that is not the architecture for which the compiler system 300 is operating. In such an example, the input code 302 may be considered not portable in view of one or more performance metrics of the target architecture. For example, the performance of the input code 302 may not be efficiently executed on an architecture different than the one the input code 302 was designed to execute at, thereby causing the target architecture to exhibit resource consumption metrics that exceed one or more thresholds (e.g., bandwidth thresholds, energy use thresholds, time-to-complete thresholds, etc.). However, the example compiler system 300 of FIG. 3 infers optimal code transformations for the input code 302 and, thus, improve performance capabilities and/or otherwise maintains performance portability for the input code 302.

In FIG. 3, the example main memory 304 is in communication with a main processor (e.g., CPU) of the target architecture. For example, the main memory 304 stores instructions for the main processor, is accessed by the main processor, etc. In some examples, the main memory 304 is in communication with the example compiler system 300 to store code transformations of incoming input code (e.g., input code 302) that is intended to be executed by the main processor.

In FIG. 3, the example compiler system 300 includes the example dependence analyzer 306 to obtain the input code 302 and analyze the dependences of the input code 302. For example, the dependence analyzer 306 performs a dependence analysis on the input code 302 to determine dependence vectors. In some examples, the dependence analyzer 306 determines dependence vectors of the source code (e.g., input code 302) instead of transformed states of the source code. In this manner, the dependence vectors are extracted at the outset of the compiling process (e.g., out the outset of code transformation). In some examples, the dependence analyzer 306 is implemented by the same dependence analyzer 106 of FIG. 1. In other examples, the dependence analyzer 306 is implemented by a different dependence analyzer than the dependence analyzer 106 of FIG. 1.

In some examples, the dependence analyzer 306 implements example means for analyzing and determining dependence vectors. The means for analyzing and determining dependence vectors is implemented by executable instructions such as that implemented by at least blocks 602 and 604 of FIG. 6. The executable instructions of blocks 602 and 604 of FIG. 6 may be executed on at least one processor such as the example processor 712 of FIG. 7. In other examples, the means for analyzing and determining dependence vectors is implemented by hardware logic, hardware implemented state machines, logic circuitry, and/or any other combination of hardware, software, and/or firmware.

In FIG. 3, the example compiler system 300 includes the example hash code generator 308 to generate one or more hash codes of the dependence vectors output by the example dependence analyzer 306. In some examples, the hash code generator 308 utilizes a hash function, configured by a developer, to generate the hash of the dependence vectors. In examples disclosed herein, the hash function utilized by the hash code generator 308 is the hash function utilized by the hash code generator 110 of FIG. 1. In this manner, the example hash code generator 308 generates hashes of dependence vectors that may match hashes of dependence vectors in the example transformation database 114. The example hash code generator 308 outputs the example hash codes for use by the example transformation controller 310.

In some examples, the hash code generator 308 implements example means for generating hash codes. The means for generating hash codes is implemented by executable instructions such as that implemented by at least block 606 of FIG. 6. The executable instructions of block 606 of FIG. 6 may be executed on at least one processor such as the example processor 712 of FIG. 7. In other examples, the means for generating hash codes is implemented by hardware logic, hardware implemented state machines, logic circuitry, and/or any other combination of hardware, software, and/or firmware.

In FIG. 3, the example compiler system 300 includes the example transformation controller 310 to control a search for transformations in the transformation database 114 that correspond to a match between the newly generated hash codes and hash codes corresponding to a learned transformation. In some examples, the transformation controller 310 performs an iterative search for transformations. For example, the transformation controller 310 obtains a first hash code corresponding to a first program state (e.g., a node) of the input code 302 and compares the first hash code to hash codes in the transformation database 114. During each iteration of searches, the example transformation controller 310 queries the hash tables stored in the example transformation database 114 for the similar hash codes as the current iteration's hash code. The hash codes in the hash tables are mapped to code variants having transformations and performance metrics. In some examples, the transformation controller 310 identifies a match when a previously learned hash code has a dependence pattern (e.g., dependence vectors) that matches the dependence pattern of the newly generated hash code. In some examples, the transformation controller 310 identifies more than one matching hash code in the transformation database 114 (e.g., more than one code variant that includes a similar pattern of dependences as a program state in input code 302). In such an example, the transformation controller 310 analyzes the performance metrics that are mapped to the hash codes retrieved from the transformation database 114 and determines which hash codes are mapped to the highest performance probability for that pattern of dependences. The example transformation determines the transformations to be applied to the input code 302 based on the success rate of the code variant mapped to the hash code.

In some examples, the transformation controller 310 implements example means for controlling selections of transformations. The means for generating controlling selections of transformations is implemented by executable instructions such as that implemented by at least blocks 608 and 610 of FIG. 6. The executable instructions of blocks 608 and 610 of FIG. 6 may be executed on at least one processor such as the example processor 712 of FIG. 7. In other examples, the means for controlling selections of transformations is implemented by hardware logic, hardware implemented state machines, logic circuitry, and/or any other combination of hardware, software, and/or firmware.

In FIG. 3, the example compiler system 300 includes the example profile controller 312 to obtain the set of optimal transformations 314, selected by the transformation controller 310 and corresponding to a program state in the input code 302, for profiling. In some examples, the profile controller 312 profiles sets of optimal transformations 314 one at a time (e.g., iteratively). In other examples, the profile controller 312 profiles all optimal transformations 314 selected for the input code 302 by the transformation controller 310. The example profile controller 312 utilizes the optimal parameters, learned during training, to profile the transformations and the hardware. In some examples, the profile controller 312 extracts performance metrics from the hardware performance counters. The example profile controller 312 analyzes the performance metrics to determine if performance improved relative to the performance probability corresponding to the optimal transformations 314. If the example profile controller 312 determined the transformations improved, the profile controller 312 applies the transformations to the input code 302 and notifies the example dependence analyzer 306 to repeat the process. For example, the profile controller 312 acts to continuously improve the function of the input code 302 on the hardware until the input code 302 can no longer be improved. In this manner, the input code 302 is transformed to the most optimal transformation and is executed.

In some examples, the profile controller 312 implements example means for profiling. The means for profiling is implemented by executable instructions such as that implemented by at least blocks 612, 614, and 616 of FIG. 6. The executable instructions of blocks 612, 614, and 616 of FIG. 6 may be executed on at least one processor such as the example processor 712 of FIG. 7. In other examples, the means for profiling is implemented by hardware logic, hardware implemented state machines, logic circuitry, and/or any other combination of hardware, software, and/or firmware.

Figure 4:
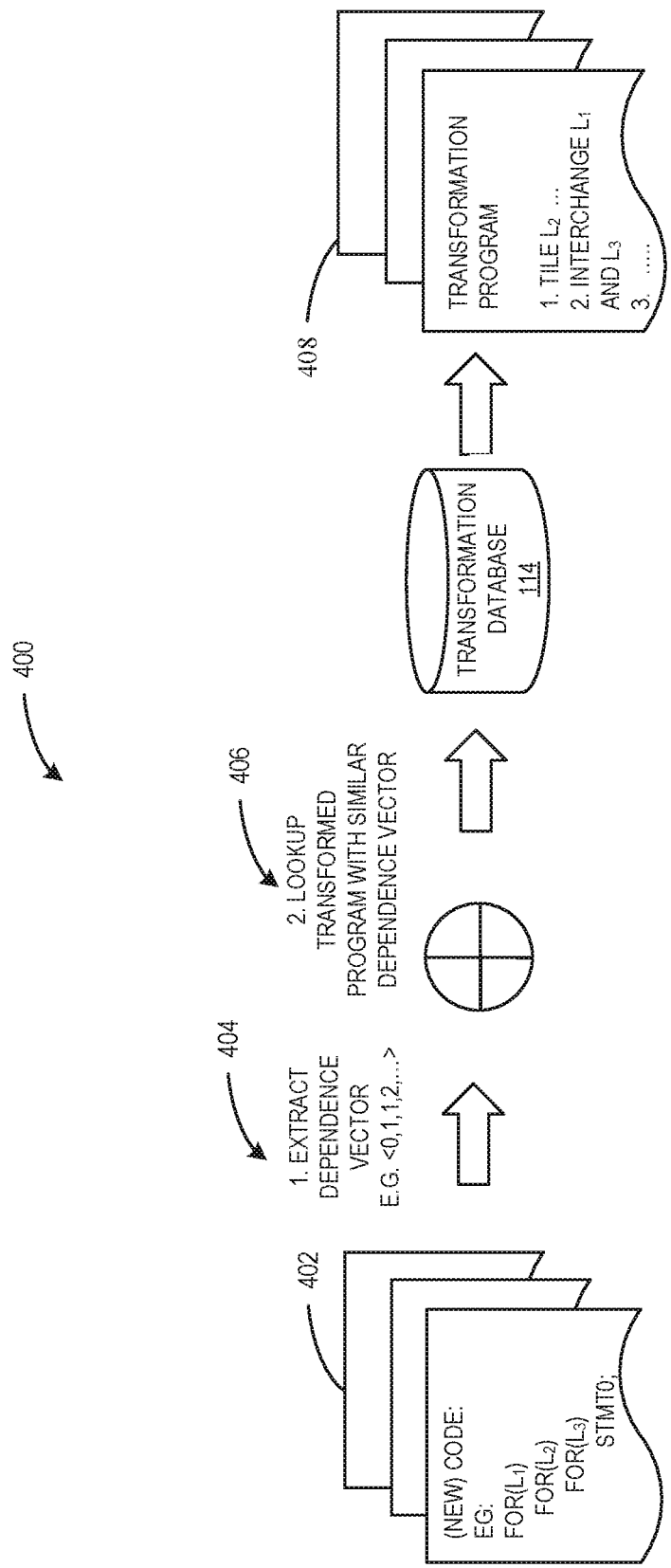
FIG. 4 is an example operation of the compiler system of FIG. 3 identifying optimal transformations for the new input code.

FIG. 4 is an example operation 400 of the compiler system 300 of FIG. 3 identifying optimal transformations for an example new input code 402. In FIG. 4, the example operation 400 illustrates a plurality of program states of the new input code 402. The example new input code 402 is illustrated as including a nested loop with three loop levels (e.g., L1, L2, and L3).

In the example operation 400, the dependence analyzer 306 of FIG. 3 obtains the nested loop program (e.g., a program state of the new input code 402) and extracts dependence vectors 404. For example, the dependence analyzer 306 extracts the distance of each loop from an access (e.g., a number of iterations required to perform memory access).

In the example operation 400, the hash code generator 308 and the transformation controller 310 of FIG. 3 work together to look up transformed programs in the transformation database 114 with similar dependence vectors 406. For example, the hash code generator 308 generates a hash code of the dependence vectors determined at step 404 and the transformation controller 310 performs the search in the transformation database 114.

In the example operation 400, the profile controller 312 of FIG. 3 profiles the selected transformation program 408. For example, the profile controller 312 executes the transformation program selected by the transformation controller 310 and extracts performance metrics from hardware performance counters. In FIG. 4, the example transformation program 408 selected includes a transformation sequence to tile the second level loop (L2) and interchange the first and third level loops (L1, L3). In some examples, the profile controller 312 feeds back the transformation program 408 to the dependence analyzer 306 when the transformation program 408 indicates an improvement during profiling.

While an example manner of implementing the compiler system 300 of FIG. 3 is illustrated in FIGS. 3 and 4, one or more of the elements, processes and/or devices illustrated in FIG. 3 may be combined, divided, re-arranged, omitted, eliminated and/or implemented in any other way. Further, the dependence analyzer 306, the example hash code generator 308, the example transformation controller 310, the example transformation database 114, the example profile controller 312, the example main memory 304, and/or, more generally, the example compiler system 300 of FIG. 3 may be implemented by hardware, software, firmware and/or any combination of hardware, software and/or firmware. Thus, for example, any of the dependence analyzer 306, the example hash code generator 308, the example transformation controller 310, the example transformation database 114, the example profile controller 312, the example main memory 304 and/or, more generally, the example compiler system 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the dependence analyzer 306, the example hash code generator 308, the example transformation controller 310, the example transformation database 114, the example profile controller 312, and/or the example main memory 304 is/are hereby expressly defined to include a non-transitory computer readable storage device or storage disk such as a memory, a digital versatile disk (DVD), a compact disk (CD), a Blu-ray disk, etc. including the software and/or firmware. Further still, the example compiler system 300 of FIG. 3 may include one or more elements, processes and/or devices in addition to, or instead of, those illustrated in FIGS. 3 and 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5A:
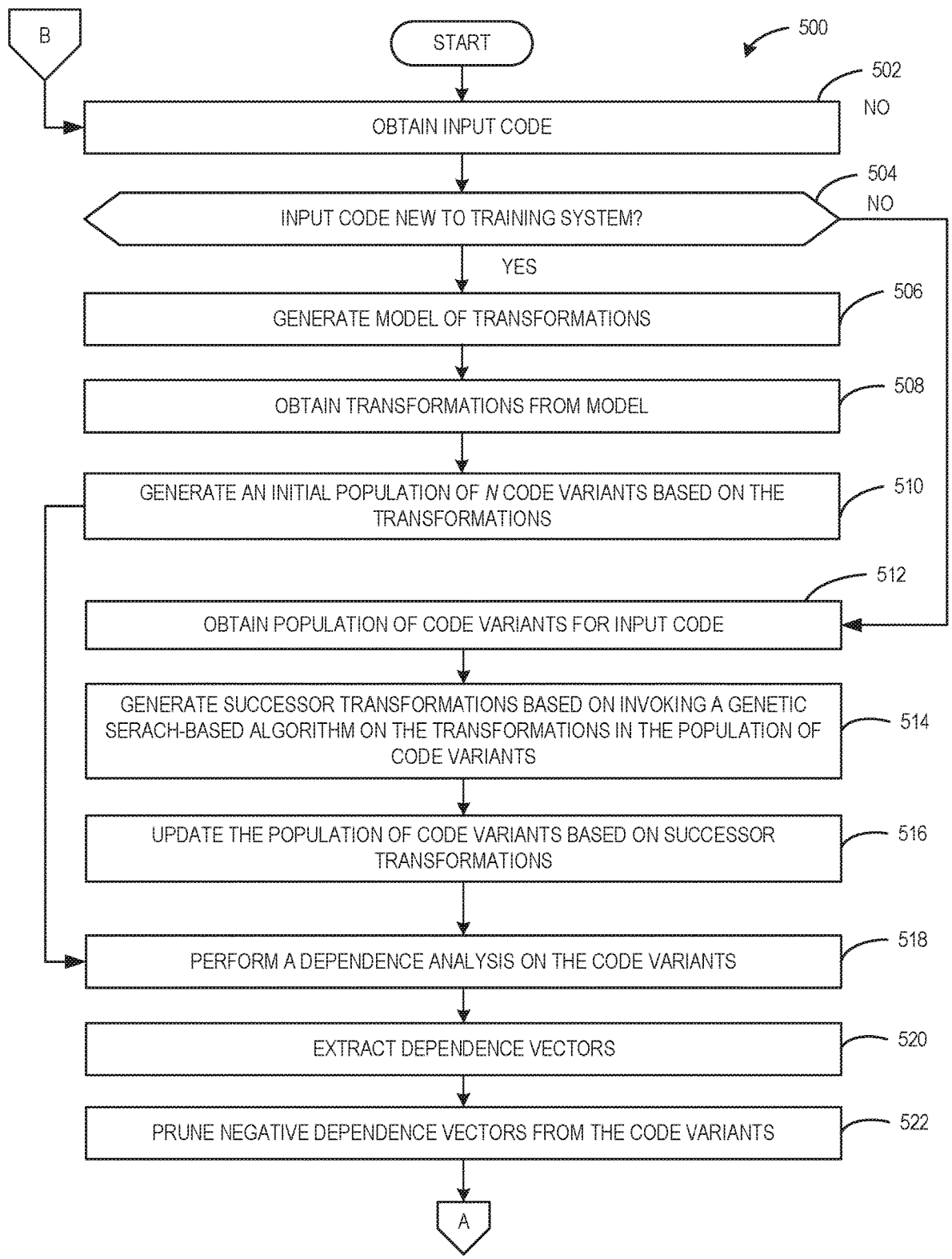
FIGS. 5A and 5B, collectively
Figure 5B:
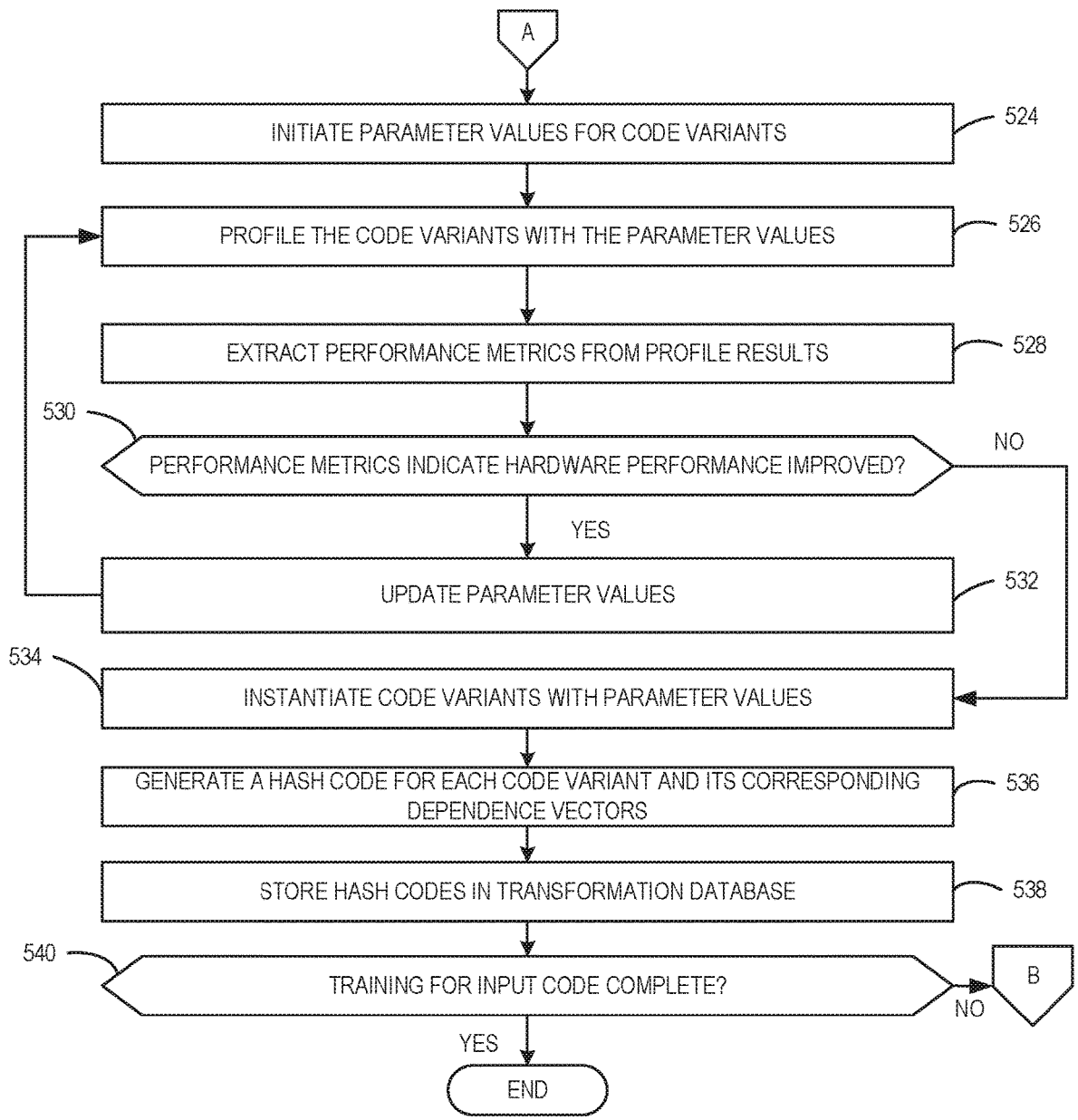
Figure 6:
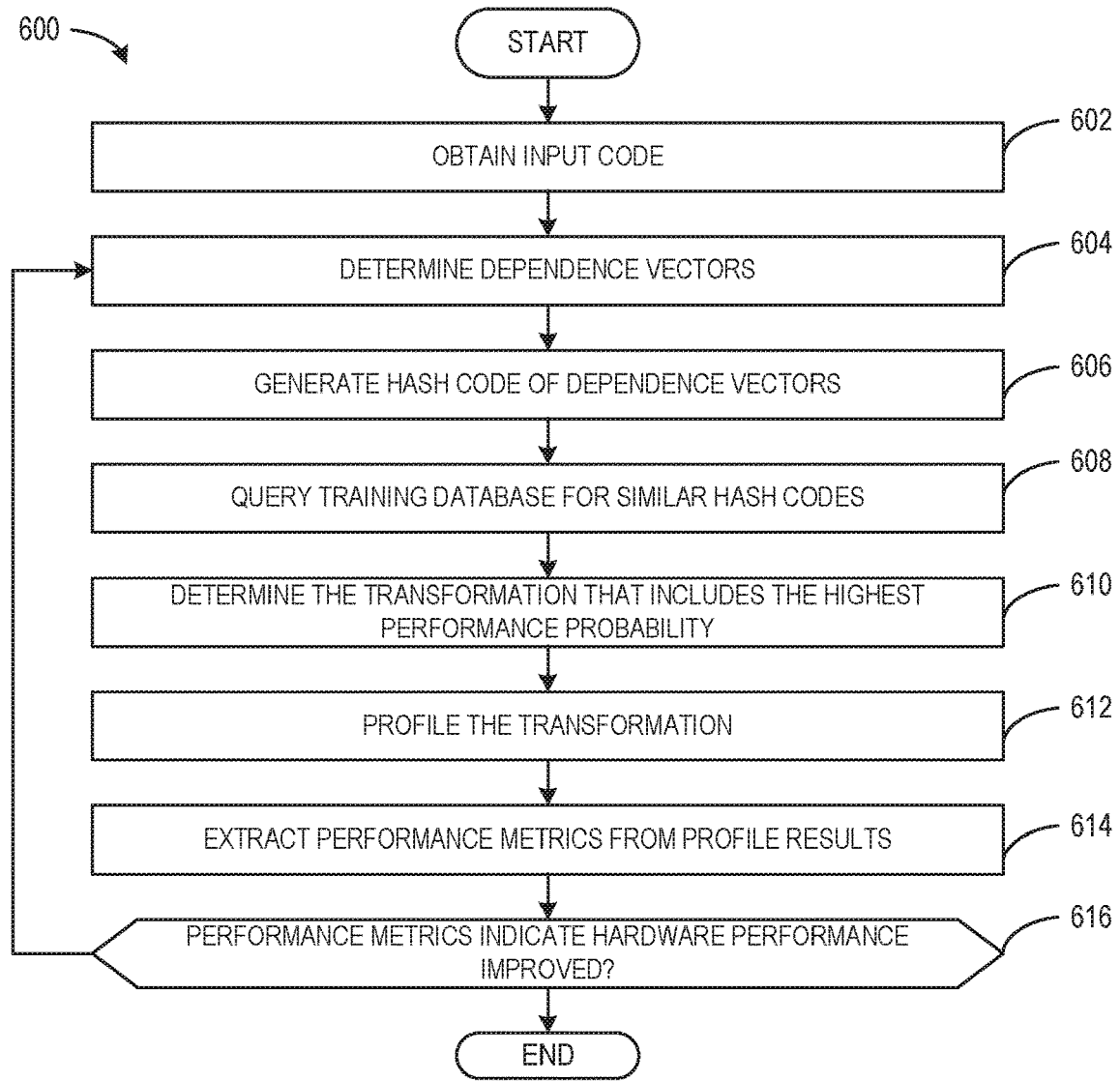
FIG. 6 is a flowchart representative of example machine readable instructions which may be executed to implement the example compiler system of FIG. 2 to infer optimal transformations for input code.

Flowcharts representative of example hardware logic, machine readable instructions, hardware implemented state machines, and/or any combination thereof for implementing the compiler training system 100 of FIG. 1 and the compiler system 300 of FIG. 3 are shown in FIGS. 5A, 5B (collectively FIG. 5), and 6. The machine readable instructions may be one or more executable programs or portion(s) of an executable program for execution by a computer processor and/or processor circuitry, such as the processor 712 shown in the example processor platform 700 discussed below in connection with FIG. 7. The program(s) may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5 and 6, many other methods of implementing the example compiler training system 100 and the example compiler system 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIGS. 5A and 5B (collectively FIG. 5) are flowcharts representative of machine readable instructions 500 which may be executed to implement the example compiler training system 100 of FIG. 1 to update a transformation database (e.g., transformation database 114) with optimal transformations of input code. The machine readable instructions 500 begin at block 502, where the example compiler training system 100 obtains input code (e.g., input code 102). For example, the transformation generator 104 (FIG. 1) obtains the input code. In some examples, the transformation generator 104 obtains the input code via wireless communication, wired communication, etc., from a network.

The example compiler training system 100 determines if the input code is new (block 504). For example, the transformation generator 104 determines if the input code is new based on a query of the transformation database 114 (FIG. 1) for matching metadata in the input code, based on information in the input code indicating the input code is new, etc.

In FIG. 5, if the example compiler training system 100 (e.g., the transformation generator 104) determines the input code is new (e.g., block 504 returns a value YES), the example compiler training system 100 generates a model of transformations (block 506). For example, the transformation generator 104 generates a polyhedral cost model representative of transformations that can be applied used for the input code. In some examples, the transformation generator 104 generates any type of model that represents possible transformations that can be used for the input code.

The example compiler training system 100 obtains the transformations from the model (block 508). For example, the transformation generator 104 selects transformations from the model to be further analyzed. In some examples, the transformation generator 104 selects the transformations based on a predicted and/or expected performance the transformations have on specific target hardware. Such predicted performances are indicated by the cost model based on heuristics of the types of transformations.

The example compiler training system 100 generates an initial population of N code variants based on the selected transformations (block 510). For example, the transformation generator 104 determines optimal transformation combinations and generates code variants based on the combinations. For example, the code variants (e.g., code variants 116a of FIG. 1) may represent different sequences of the same transformations.

The example compiler training system 100 performs a dependence analysis on the code variants (block 518). For example, the dependence analyzer 106 obtains the code variants and identifies dependences that the N code variants include.

The example compiler training system 100 extracts dependence vectors (block 520). For example, the dependence analyzer 106 extracts dependence vectors from the analysis. In some examples, the dependence analyzer 106 performs an iterative analysis on the code variants, such that a first code variant is analyzed and first dependence vectors are extracted, a second code variant is analyzed and second dependence vectors are extracted, etc.

The example compiler training system 100 prunes negative dependence vectors from the code variants (block 522). For example, the dependence analyzer 106 removes, deletes, invalidates, etc., code variants that include one or more negative dependence vectors. In some examples, the code variants including negative dependence vectors may execute incorrectly, may generate unwanted cache misses, may slow down the processing of the input code, etc. Therefore, the example dependence analyzer 106 limits the search space of transformations and combinations to relevant and useful code variants.

In some examples, if the compiler training system 100 determines the input code is not new (e.g., block 504 returns a value NO), the example compiler training system 100 obtains a population of code variants corresponding to the input code (block 512). For example, the transformation generator 104 obtains a code variants pre-populated from the transformation database 114. In some examples, the code variants may be re-trained and analyzed to determine if further optimization is possible.

The example compiler training system 100 generates successor transformations based on invoking a genetic search-based algorithm on the transformations in the population of code variants (block 514). For example, the transformation generator 104 performs a genetic search on the transformations to generate mutated transformations that will optimize the sequence of the code variant.

The example compiler training system 100 updates the population of code variants based on the successor transformations (block 516). For example, the transformation generator 104 uses the mutated transformations to re-populate the code variants. Control returns to block 518 when the transformation generator 104 updates the population of code variants.

Turning to FIG. 5B, the example compiler training system 100 initiates parameter values for the code variants (block 524). For example, the profile controller 108 (FIG. 1) obtains the updated code variants that were not pruned and determines initial parameter values that could be used to execute the code variants. In some examples, the profile controller 108 utilizes data from the input code to determine parameter values based on the program state that the code variant corresponds to.

The example compiler training system 100 profiles the code variants with the parameter values (block 526). For example, the profile controller 108 executes the transformed input code and analyzes hardware performance counters to identify how the transformations effected the performance of the target hardware.

The example compiler training system 100 extracts performance metrics from the profiling results (block 528). For example, the profile controller 108 extracts the performance metrics (e.g., cache misses, instructions executed, etc.) from hardware counters to determine the effect the transformed input code had on the hardware.

The example compiler training system 100 determines whether the performance metrics indicate if the hardware performance improved (block 530). For example, the profile controller 108 determines if the hardware performance was better than performance predicted by the cost model, determines if the performance metrics were greater than an average metric and/or general trend of that metric, etc. In some examples, the profile controller 108 compares the user-defined and/or system defined peak performance with the hardware performance of the profiling results to identify whether the transformations met the user-defined and/or system defined peak performance.

In some examples, the compiler training system 100 determines the performance metrics did improve (e.g., block 530 returned a value YES) and the compiler training system 100 updates parameters values (block 532). For example, the profile controller 108 utilizes feedback directed optimization to incrementally update or search for the optimal parameters.

When the example compiler training system 100 updates the parameter values (block 532), control returns to block 526. For example, the profile controller 108 profiles the code variants with the updated parameters (block 526).

In some examples, when the performance metrics do not indicate that the hardware performance improved (e.g., block 530 returns a value NO), the example compiler training system 100 instantiates the code variants with the parameter values (block 534). For example, the profile controller 108 makes a copy of the code variants and respective parameter values that provided optimal results on the hardware.

The example compiler training system 100 generates a hash for each code variant and its corresponding dependence vectors (block 536). For example, the example hash code generator 110 (FIG. 1) obtains the instantiated code variants and generates a hash code of the sequence, the corresponding dependence vectors, and the performance probability (e.g., the performance metrics) utilizing a hash function. In some examples, each code variant that survived the dependence analysis and profiling includes a corresponding hash code. In some examples, the hash code generator 110 generates a hash code of the dependence vectors and maps the hash code to the corresponding code variant and performance probability.

The example compiler training system 100 stores the hash codes in the example transformation database 114 (block 538). For example, the transformation controller 112 (FIG. 1) obtains the hash codes and stores them in a hash table that maps them to corresponding code variants. Such a hash table is included and/or stored in the example transformation database 114.

The example compiler training system 100 determines if the training for the input code is complete (block 540). For example, the transformation controller 112 determines if the input code 102 was new and needs to be fed back into the transformation generator 104. In other examples, the transformation controller 112 determines, based on information from the transformation generator 104, that convergence was not reached during transformation generation and/or during genetic searching. In some examples, when the compiler training system 100 determines that the training for input code is not complete (e.g., block 540 returns a value NO), control returns to block 502. In other examples, when the compiler training system 100 determines that the training for input code is complete (e.g., block 540 returns a value YES), the example machine readable instructions 500 end. The example machine readable instructions 500 may be repeated when the example compiler training system 100 obtains input code.

FIG. 6 is a flowchart representative of machine readable instructions 600 which may be executed to implement the example compiler system 300 of FIG. 3 operating in an inference mode. The machine readable instructions 600 begin at block 602 when the example compiler system 300 obtains input code (block 602). For example, the dependence analyzer 306 (FIG. 3) obtains input code (e.g., new input code 302) in real time.

The example compiler system 300 determines dependence vectors of the input code (block 604). For example, dependence analyzer 306 performs a dependence analysis on the input code (e.g., new input code 302) to identify dependence vectors of various program states. In some examples, the dependence analyzer 306 performs an iterative dependence analysis on the input code, such that each program state, from beginning to end, is analyzed one by one and dependence vectors are extracted and sent for further processing of the corresponding program state.

The example compiler system 300 generates a hash code of the dependence vectors (block 606). For example, the hash code generator 308 (FIG. 3) utilizes a hash function to generate a hash code that represents the pattern of dependences in a program state. In some examples, the hash code generator 308 utilizes the same hash function as the hash code generator 110 of the example compiler training system 100.

The example compiler system 300 queries the transformation database 114 for similar hash codes (block 608). For example, the transformation controller 310 (FIG. 3) performs a search in the transformation database 114 by comparing the new hash code to previously generated hash codes to identify a match. In some examples, the transformation controller 310 identifies a plurality of matching hash codes in the transformation database 114.

In some examples, the compiler system 300 determines the transformation that includes the highest performance probability (block 610). For example, the transformation controller 310 compares performance probabilities of all the matching hashes and selects the hash code having the highest performance, the hash code mapped to a sequence of transformations.

The example compiler system 300 profiles the transformation (block 612). For example, the profile controller 312 (FIG. 3) executes the transformation and/or sequence of transformations with respective parameters to determine how the hardware performs.

The example compiler system 300 extracts the performance metrics from the profile results (block 614). For example, the profile controller 312 extracts the metrics from the hardware performance counters after the profiling is complete.

The example compiler system 300 determines if performance metrics indicate the hardware performance was improved (block 616). For example, if the profile controller 312 whether the performance metrics were improved relative to the expected performance (e.g., the expected performance probability corresponding to the transformation). In some examples, when the compiler system 300 determines hardware performance improved (e.g., block 616 returns a value YES), control returns to block 604. For example, when the profile controller 312 determines the transformations optimized the input code, the profile controller 312 triggers the dependence analyzer to analyze the current (e.g., the profiled) transformation. In other examples, when the compiler system 300 determines hardware performance did not improve (e.g., block 616 returns a value NO), the machine readable instructions 600 ends. For example, the profile controller 312 provides the profiled transformations to the main memory 304 (FIG. 3) to be stored for subsequent processing. In some examples, the machine readable instructions 600 are repeated when the compiler system 300 obtains new input code.

Figure 7:
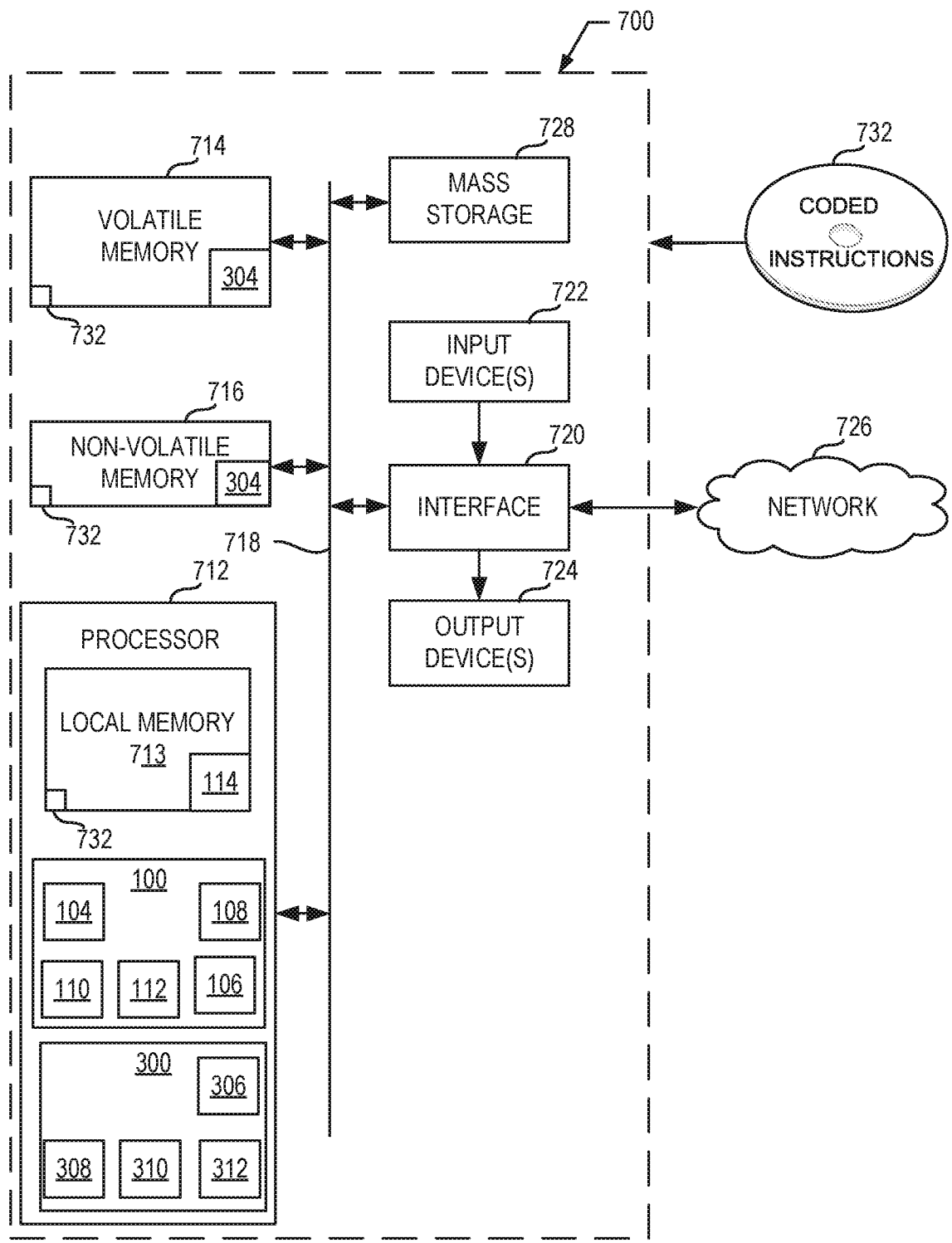
FIG. 7 is a block diagram of an example processing platform structured to execute the instructions of FIGS. 5-6 to implement the example compiler training system of FIG. 1 and the example compiler system of FIG. 3.

FIG. 7 is a block diagram of an example processor platform 700 structured to execute the instructions of FIGS. 5 and 6 to implement the compiler training system 100 of FIG. 1 and the compiler system 300 of FIG. 3. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example compiler training system 100, the example transformation generator 104, the example dependence analyzer 106, the example profile controller 108, the example hash code generator 110, the example transformation controller 112, the example compiler system 300, the example dependence analyzer 306, the example hash code generator 308, the example transformation controller 310, and/or the example profile controller 312.

The processor 712 of the illustrated example includes a local memory 713 (e.g., a cache). In some examples, the local memory 713 implements the transformation database 114. The processor 712 of the illustrated example is in communication with a main memory (e.g., main memory 304) including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. In some examples, the volatile memory 714 implements the main memory 304. In some examples, non-volatile memory 716 implements the main memory 304. In some examples, both the volatile and non-volatile implement the main memory 304. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a camera (still or video), a keyboard, a button, a mouse, and/or a touchscreen.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5-6 may be stored in the mass storage device 728, in the volatile memory 714, in the non-volatile memory 716, and/or on a removable non-transitory computer readable storage medium such as a CD or DVD.

Example methods, apparatus, systems, and articles of manufacture to automatically optimize software programs are disclosed herein. Further examples and combinations thereof include the following:

Example 1 includes an apparatus comprising a transformation generator to generate a population of code variants corresponding to an input code, the population of code variants to include transformation sequences of the input code, a dependence analyzer to analyze the population of code variants for dependence vectors, a profile controller to profile the population of code variants to determine performance metrics of hardware during an execution of respective ones of the transformation sequences, and a hash code generator to generate hash codes for storing in a database, the hash codes (a) corresponding to a combination of the dependence vectors and respective performance metrics and (b) mapped to respective transformation sequences.

Example 2 includes the apparatus of example 1, wherein the transformation generator is to utilize a polyhedral cost model to generate the population of code variants.

Example 3 includes the apparatus of example 1, wherein the transformation generator is to determine if the input code is new based on querying the database for a corresponding model of the transformation sequences, in response to determining the input code is not new obtain a previously generated population of code variants, generate successor transformation sequences based on invoking a genetic search-based algorithm on the transformation sequences in the previously generated population of code variants, and update the previously generated population of code variants with the successor transformation sequences.

Example 4 includes the apparatus of example 1, wherein the dependence analyzer is to prune code variants that include transformation sequences having negative dependence vectors.

Example 5 includes the apparatus of example 1, wherein the profile controller is to determine parameter values for the population of code variants to profile the population of code variants, the parameter values required by the transformation sequences to execute the transformation sequences.

Example 6 includes the apparatus of example 5, wherein the parameter values are first parameter values, the profile controller is to extract the performance metrics from hardware counters of the hardware executing the input code, determine if the performance metrics indicate that a performance of the hardware improved during profiling, in response to determining the performance of the hardware improved generate second parameter values to instantiate the transformation sequences based on feedback directed optimization, and profile the population of code variants to determine new performance metrics.

Example 7 includes the apparatus of example 1, wherein the hash code generator is to generate a hash code of the dependence vectors and the performance metrics utilizing a hash function.

Example 8 includes a non-transitory computer readable storage medium comprising instructions that, when executed, cause one or more processors to at least generate a population of code variants corresponding to an input code, the population of code variants to include transformation sequences of the input code, analyze the population of code variants for dependence vectors, profile the population of code variants to determine performance metrics of hardware during an execution of respective ones of the transformation sequences, and generate hash codes for storing in a database, the hash codes (a) corresponding to a combination of the dependence vectors and respective performance metrics and (b) mapped to respective transformation sequences.

Example 9 includes the non-transitory computer readable storage medium of example 8, wherein the instructions, when executed, cause the one or more processors to utilize a polyhedral cost model to generate the population of code variants.

Example 10 includes the non-transitory computer readable storage medium of example 8, wherein the instructions, when executed, cause the one or more processors to determine if the input code is new based on querying the database for a corresponding model of the transformation sequences, in response to determining the input code is not new obtain a previously generated population of code variants, generate successor transformation sequences based on invoking a genetic search-based algorithm on the transformation sequences in the previously generated population of code variants, and update the previously generated population of code variants with the successor transformation sequences.

Example 11 includes the non-transitory computer readable storage medium of example 8, wherein the instructions, when executed, cause the one or more processors to prune code variants that include transformation sequences having negative dependence vectors.

Example 12 includes the non-transitory computer readable storage medium of example 8, wherein the instructions, when executed, cause the one or more processors to determine parameter values for the population of code variants to profile the population of code variants, the parameter values required by the transformation sequences to execute the transformation sequences.

Example 13 includes the non-transitory computer readable storage medium of example 12, wherein the parameter values are first parameter values and, the instructions, when executed, cause the one or more processors to extract the performance metrics from hardware counters of the hardware executing the input code, determine if the performance metrics indicate that a performance of the hardware improved during profiling, in response to determining the performance of the hardware improved generate second parameter values to instantiate the transformation sequences based on feedback directed optimization, and profile the population of code variants to determine new performance metrics.

Example 14 includes the non-transitory computer readable storage medium of example 8, wherein the instructions, when executed, cause the one or more processors to generate a hash code of the dependence vectors and the performance metrics utilizing a hash function.

Example 15 includes an apparatus comprising means for generating a population of code variants corresponding to an input code, the population of code variants to include transformation sequences of the input code, means for analyzing the population of code variants for dependence vectors, means for profiling the population of code variants to determine performance metrics of hardware during an execution of respective ones of the transformation sequences, and means for generating hash codes for storing in a database, the hash codes (a) corresponding to a combination of the dependence vectors and respective performance metrics and (b) mapped to respective transformation sequences.

Example 16 includes the apparatus of example 1, wherein the means for generating the population of code variants includes utilizing a polyhedral cost model.

Example 17 includes the apparatus of example 1, wherein the means for generating the population of code variants includes determining if the input code is new based on querying the database for a corresponding model of the transformation sequences, in response to determining the input code is not new obtain a previously generated population of code variants, generate successor transformation sequences based on invoking a genetic search-based algorithm on the transformation sequences in the previously generated population of code variants, and update the previously generated population of code variants with the successor transformation sequences.

Example 18 includes the apparatus of example 1, wherein the means for analyzing is to prune code variants that include transformation sequences having negative dependence vectors.

Example 19 includes the apparatus of example 1, wherein the means for profiling is to determine parameter values for the population of code variants to profile the population of code variants, the parameter values required by the transformation sequences to execute the transformation sequences.

Example 20 includes the apparatus of example 19, wherein the parameter values are first parameter values, the means for profiling to extract the performance metrics from hardware counters of the hardware executing the input code, determine if the performance metrics indicate that a performance of the hardware improved during profiling, in response to determining the performance of the hardware improved generate second parameter values to instantiate the transformation sequences based on feedback directed optimization, and profile the population of code variants to determine new performance metrics.

Example 21 includes the apparatus of example 1, wherein the means for generating hash codes is to generate a hash code of the dependence vectors and the performance metrics utilizing a hash function.

Example 22 includes a method comprising generating a population of code variants corresponding to an input code, the population of code variants to include transformation sequences of the input code, analyzing the population of code variants for dependence vectors, profiling the population of code variants to determine performance metrics of hardware during an execution of respective ones of the transformation sequences, and generating hash codes for storing in a database, the hash codes (a) corresponding to a combination of the dependence vectors and respective performance metrics and (b) mapped to respective transformation sequences.

Example 23 includes the method of example 22, further including utilizing a polyhedral cost model to generate the population of code variants.

Example 24 includes the method of example 22, further including determining if the input code is new based on querying the database for a corresponding model of the transformation sequences, in response to determining the input code is not new obtaining a previously generated population of code variants, generating successor transformation sequences based on invoking a genetic search-based algorithm on the transformation sequences in the previously generated population of code variants, and updating the previously generated population of code variants with the successor transformation sequences.

Example 25 includes the method of example 22, further including pruning code variants that include transformation sequences having negative dependence vectors.

Example 26 includes the method of example 22, further including determining parameter values for the population of code variants to profile the population of code variants, the parameter values required by the transformation sequences to execute the transformation sequences.

Example 27 includes the method of example 26, wherein the parameter values are first parameter values, the method including extracting the performance metrics from hardware counters of the hardware executing the input code, determining if the performance metrics indicate that a performance of the hardware improved during profiling, in response to determining the performance of the hardware improved generating second parameter values to instantiate the transformation sequences based on feedback directed optimization, and profiling the population of code variants to determine new performance metrics.

Example 28 includes the method of example 22, further including generating a hash code of the dependence vectors and the performance metrics utilizing a hash function.

From the foregoing, it will be appreciated that example methods, apparatus and articles of manufacture have been disclosed that improve software program performance, automate code optimization by utilizing modern hardware instead of wasting programmer engineering time, and create scalable software performance engineering and maintenance. The disclosed methods, apparatus and articles of manufacture improve the efficiency of using a computing device by optimizing code transformations to increase hardware efficiency. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   memory;
   programmable circuitry; and
   machine readable instructions to cause the programmable circuitry to:
     generate a population of code variants corresponding to an input code, the population of code variants to include transformation sequences of the input code;
     analyze the population of code variants for dependence vectors;
     profile the population of code variants to determine performance metrics of hardware during an execution of respective ones of the transformation sequences; and
     generate hash codes for storing in a database, the hash codes (a) corresponding to a combination of the dependence vectors and respective performance metrics and (b) mapped to respective transformation sequences.

2. The apparatus of claim 1, wherein the programmable circuitry is to utilize a polyhedral cost model to generate the population of code variants.

3. The apparatus of claim 1, wherein the programmable circuitry is to:
   determine if the input code is new based on querying the database for a corresponding model of the transformation sequences;
   in response to determining the input code is not new:
     obtain a previously generated population of code variants;
     generate successor transformation sequences based on invoking a genetic search-based algorithm on the transformation sequences in the previously generated population of code variants; and
     update the previously generated population of code variants with the successor transformation sequences.

4. The apparatus of claim 1, wherein the programmable circuitry is to prune code variants that include transformation sequences having negative dependence vectors.

5. The apparatus of claim 1, wherein the programmable circuitry is to determine parameter values for the population of code variants to profile the population of code variants, the parameter values required by the transformation sequences to execute the transformation sequences.

6. The apparatus of claim 5, wherein the parameter values are first parameter values, the programmable circuitry is to:
   extract the performance metrics from hardware counters of the hardware executing the input code;
   determine if the performance metrics indicate that a performance of the hardware improved during profiling;
   in response to determining the performance of the hardware improved:
     generate second parameter values to instantiate the transformation sequences based on feedback directed optimization; and
     profile the population of code variants to determine new performance metrics.

7. The apparatus of claim 1, wherein the programmable circuitry is to generate a hash code of the dependence vectors and the performance metrics utilizing a hash function.

8. A non-transitory computer readable storage medium comprising instructions that, when executed, cause one or more processors to at least:
generate a population of code variants corresponding to an input code, the population of code variants to include transformation sequences of the input code;
analyze the population of code variants for dependence vectors;
profile the population of code variants to determine performance metrics of hardware during an execution of respective ones of the transformation sequences; and
generate hash codes for storing in a database, the hash codes (a) corresponding to a combination of the dependence vectors and respective performance metrics and (b) mapped to respective transformation sequences.

9. The non-transitory computer readable storage medium of claim 8, wherein the instructions, when executed, cause the one or more processors to utilize a polyhedral cost model to generate the population of code variants.

10. The non-transitory computer readable storage medium of claim 8, wherein the instructions, when executed, cause the one or more processors to:
determine if the input code is new based on querying the database for a corresponding model of the transformation sequences;
in response to determining the input code is not new:
obtain a previously generated population of code variants;
generate successor transformation sequences based on invoking a genetic search-based algorithm on the transformation sequences in the previously generated population of code variants; and
update the previously generated population of code variants with the successor transformation sequences.

11. The non-transitory computer readable storage medium of claim 8, wherein the instructions, when executed, cause the one or more processors to prune code variants that include transformation sequences having negative dependence vectors.

12. The non-transitory computer readable storage medium of claim 8, wherein the instructions, when executed, cause the one or more processors to determine parameter values for the population of code variants to profile the population of code variants, the parameter values required by the transformation sequences to execute the transformation sequences.

13. The non-transitory computer readable storage medium of claim 12, wherein the parameter values are first parameter values and, the instructions, when executed, cause the one or more processors to:
extract the performance metrics from hardware counters of the hardware executing the input code;
determine if the performance metrics indicate that a performance of the hardware improved during profiling;
in response to determining the performance of the hardware improved:
generate second parameter values to instantiate the transformation sequences based on feedback directed optimization; and
profile the population of code variants to determine new performance metrics.

14. The non-transitory computer readable storage medium of claim 8, wherein the instructions, when executed, cause the one or more processors to generate a hash code of the dependence vectors and the performance metrics utilizing a hash function.

15. An apparatus comprising:
means for generating a population of code variants corresponding to an input code, the population of code variants to include transformation sequences of the input code;
means for analyzing the population of code variants for dependence vectors;
means for profiling the population of code variants to determine performance metrics of hardware during an execution of respective ones of the transformation sequences; and
means for generating hash codes for storing in a database, the hash codes (a) corresponding to a combination of the dependence vectors and respective performance metrics and (b) mapped to respective transformation sequences.

16. The apparatus of claim 1, wherein the means for generating the population of code variants includes utilizing a polyhedral cost model.

17. The apparatus of claim 1, wherein the means for generating the population of code variants includes:
determining if the input code is new based on querying the database for a corresponding model of the transformation sequences;
in response to determining the input code is not new:
obtain a previously generated population of code variants;
generate successor transformation sequences based on invoking a genetic search-based algorithm on the transformation sequences in the previously generated population of code variants; and
update the previously generated population of code variants with the successor transformation sequences.

18. The apparatus of claim 1, wherein the means for analyzing is to prune code variants that include transformation sequences having negative dependence vectors.

19. The apparatus of claim 1, wherein the means for profiling is to determine parameter values for the population of code variants to profile the population of code variants, the parameter values required by the transformation sequences to execute the transformation sequences.

20. The apparatus of claim 19, wherein the parameter values are first parameter values, the means for profiling to:
extract the performance metrics from hardware counters of the hardware executing the input code;
determine if the performance metrics indicate that a performance of the hardware improved during profiling;
in response to determining the performance of the hardware improved:
generate second parameter values to instantiate the transformation sequences based on feedback directed optimization; and
profile the population of code variants to determine new performance metrics.

21. The apparatus of claim 1, wherein the means for generating hash codes is to generate a hash code of the dependence vectors and the performance metrics utilizing a hash function.

22. A method comprising:
generating a population of code variants corresponding to an input code, the population of code variants to include transformation sequences of the input code;
analyzing the population of code variants for dependence vectors;
profiling the population of code variants to determine performance metrics of hardware during an execution of respective ones of the transformation sequences; and
generating hash codes for storing in a database, the hash codes (a) corresponding to a combination of the dependence vectors and respective performance metrics and (b) mapped to respective transformation sequences.

23. The method of claim 22, further including utilizing a polyhedral cost model to generate the population of code variants.

24. The method of claim 22, further including:
determining if the input code is new based on querying the database for a corresponding model of the transformation sequences;
in response to determining the input code is not new:
obtaining a previously generated population of code variants;
generating successor transformation sequences based on invoking a genetic search-based algorithm on the transformation sequences in the previously generated population of code variants; and
updating the previously generated population of code variants with the successor transformation sequences.

25. The method of claim 22, further including pruning code variants that include transformation sequences having negative dependence vectors.

* * * * *